324-77

SEARCH ROOM

Feb. 7, 1961 H. HURVITZ 2,971,155

DOUBLE REFLEX SPECTRUM ANALYZER

Filed Oct. 3, 1956

INVENTOR.

Hyman Hurvitz

United States Patent Office 2,971,155
Patented Feb. 7, 1961

2,971,155

DOUBLE REFLEX SPECTRUM ANALYZER

Hyman Hurvitz, 1313 Juniper St. NW., Washington, D.C.

Filed Oct. 3, 1956, Ser. No. 613,770
18 Claims. (Cl. 324—77)

Figure 1:
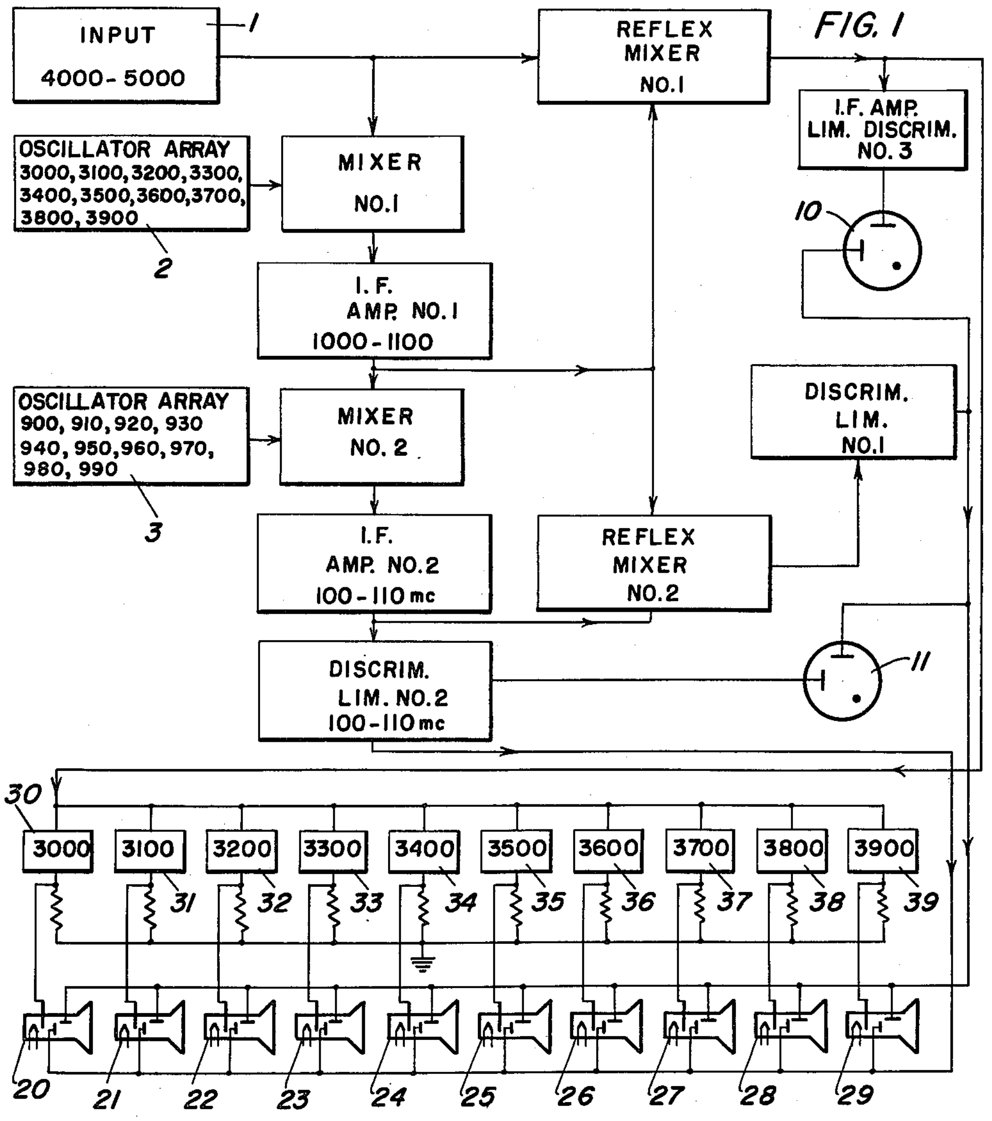

This application is a continuation-in-part of my application Serial No. 605,546, filed August 22, 1956.

The present invention relates generally to spectrum analyzers, and more particularly to wide-open wide band spectrum analyzers having excellent resolution, and capable of instantaneous response to signals of any frequency occurring at random within the wide band.

It is an object of the present invention to provide a wide open system for instantaneously visually displaying the frequency positions of pulse signals anywhere within a very wide band of frequencies, with extremely high accuracy. No relatively simple system has been devised for maintaining surveillance of an extremely wide frequency band with high percentage accuracy, to determine instantaneously the positions of multiple frequencies within the band. Frequency scanning spectrum analyzers have the basic and ineradicable defect that they are not wide-open over the band under serveillance, and therefore that incoming signals may be missed. The known types of devices of the character under consideration, which employ limiter-frequency discriminators to provide "wide-open" operating characteristics, have been found impractical for wide band operation, because no adequate wide band limiters and discriminators are available. The problem of surveillance may be as follows: maintain continuous surveillance of a band 1,000 mc. wide, and measure and display any incoming frequency, with an accuracy of one part in 5,000, i.e. to the nearest ⅕ mc.

Figure 2:
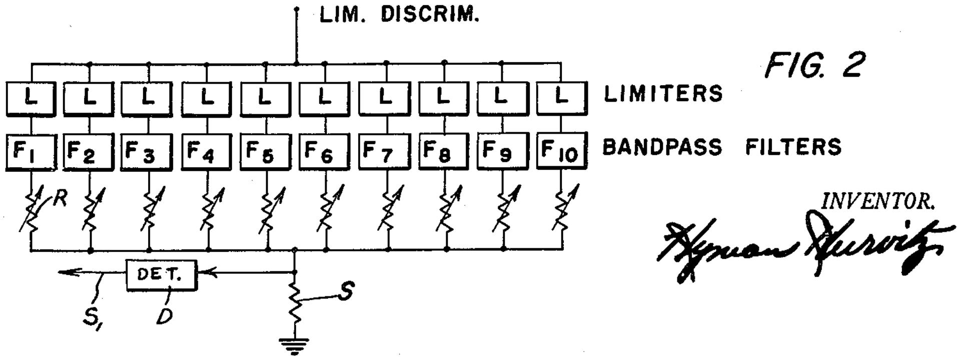

In the drawings:

Figure 1 is a functional block diagram of a system according to the invention; and Figure 2 is a functional block diagram of a novel limiter-discriminator employed in the practice of the invention.

The reference numeral 1 denotes a source of a spectrum for the band 4,000–5,000 mc., specified for example only. This band is applied to mixer #1 together with an array of local oscillator frequencies, from local oscillator array 2, having the following discrete values: 3,000, 3,100, . . . 3,900 mc. It follows that any frequency in the band 4,000–5,000 mc. will be converted to the I.F. band 1,000 to 1,100 mc. passed by I.F. amplifier #1, and will have a frequency position within the I.F. band corresponding with its position within a 100 mc. wide sub-band of the band 4,000–5,000 mc. For example, a frequency of 4,000 mc. will convert to 1,000 mc., and this will likewise be true of 4,100, 4,200. . . . etc. A frequency of 4,010 will convert to 1,010 mc. and this will also be true of 4,110, 4,210. . . . It may therefore be considered that the band 4,000–5,000 is made up of ten (10) sub-bands, each 100 mc. wide, and that each sub-band is converted by a different one of the local oscillator frequencies to the same I.F. band.

The output of I.F. amplifier #1 is applied to mixer #2, to which is applied an array of local oscillator frequencies, 900, 910, 920 . . . 990 mc. from local oscillator array 3. The I.F. band 1,000–1,100 mc. may be conceived as made up of sub-bands ten (10) mc. wide, each of which is heterodyned in mixer #2 by a different one of the local oscillator frequencies derived from array 3. The mixer #2 leads to an I.F. amplifier #2, having a pass band 100–110 mc.

In response to any single input frequency the output of I.F. amplifier #1 is applied, together with the input spectrum to reflex mixer #1, the output of which is the local oscillator frequency from array 2 which caused the original conversion. The output of I.F. amplifier #2 is applied to reflex mixer #2 together with the output of I.F. amplifier #1, and its output is the one of local oscillator frequencies from array 3 which effected conversion.

To provide an example, assume an input frequency of 4001 mc. It will heterodyne with 3000 mc. to provide an I.F. frequency of 1001 mc. which will convert in reflex mixer #1 to provide an output frequency of 4001−1001=3000. The frequency 1001 will convert with local oscillator frequency 900 to provide an I.F. signal of 101 mc., which will convert with 1001 mc. to provide 900 mc.

It follows that the outputs of the so-called reflex mixers will consist of one of the local oscillator frequencies of array 2 and one of the local oscillator frequencies of array 3. These two local oscillator frequencies will identify the sub-bands, one 100 mc. wide and one 10 mc. wide, within which an input signal occurs, and hence narrows the location of the signal to within 10 mc. The location within that 10 mc. band may be determined in terms of the output a limiter discriminator #2, which is coupled to I.F. amplifier #2 and is designed for the band 100–110 mc. It follows that three identifying signals represent the frequency value of an input signal to any accuracy readable at the output of limiter and frequency discriminator #2. Since the latter is only 10 mc. wide, at 105 mc. center frequency, its design presents no problem, and it may readily be made accurate to 2%. The overall accuracy of the system is then to one part in 5,000.

The bandwidth surveyed may readily be extended, and/or the accuracy may be increased by adding local oscillator frequencies to the arrays 2, 3 or either of them, and/or by adopting spacings other than those above suggested.

Recapitulating, in response to a single input frequency in the exemplary band 4,000 to 5,000 mc., at input circuit 1, a frequency will appear at the output of reflex mixer #1, which will correspond with one frequency selected from array 2, and will identify the 100 mc. sub-band of main band 4,000–5,000 mc., within which the input frequency fell. At the output of reflex mixer #2 will appear a single frequency selected from array 3, which identifies the 10 mc. sub-sub band of the 100 mc. sub-band within which the input signal occurred. The signal is thus identified to one part in one hundred, i.e. to 1%. The output of limiter discriminator #2 is a D.-C. voltage representative of the position of the input signal within the 10 mc. sub-sub band.

The limiter discriminator #1 generates a voltage proportional to the oscillator array frequency supplied thereto. The I.F. amplifier and limiter-discriminator #3 generates a voltage proportional to the oscillator array frequency applied thereto, i.e. one of the frequencies of array 2.

By applying the output of limiter-discriminator #3 and #1, respectively, to the vertical and horizontal deflection electrodes of a cathode ray tube indicator 10, a spot is generated on the face of the indicator at position having an ordinate which identifies the sub-band and an abscissa which identifies the sub-sub-band in which a signal subsists. The display of oscilloscope 10 is thus two dimensional and accurate to 1%.

Similarly, the outputs of limiter discriminators #1 to #2 may be applied to the vertical and horizontal deflection electrodes of cathode ray tube 11. A single input frequency may thus be analyzed with an accuracy of a small fraction of one percent, by means of two oscilloscopes. If many pulse signals are continuously present, at random frequencies, the display on oscilloscope 11 may be ambiguous, i.e. unrelatable to the display on oscilloscope 10, in some although not in all circumstances.

As a more elaborate display system I may employ one oscilloscope for each frequency of array 2. The oscilloscopes are 20, 21, 22, . . . 29. The intensity control grid of each oscilloscope is coupled to the output of reflex mixer #1 via a different filter, the filters 30, 31, . . . 39 respectively, being tuned to pass only frequencies 3,000, 3,100 . . . 3,900 mc., respectively. Therefore, each of oscilloscopes 30 to 39 provides a display for only one of the sub-bands. The vertical deflection electrodes are all supplied with output signal from limiter discriminator #1 and the horizontal electrodes from limiter discriminator #2. Each oscilloscope, of 30–39, presents on its face the frequency content of one 100 mc. sub-band, as a two-dimensional display. Ordinates represent position in a 100 mc. sub-band and abscisse in a 10 mc. sub-sub-band.

Limiters need not be employed in conjunction with filters 30–39, so that spot intensity is a function of signal intensity.

Limiter-discriminators #1 and #3 are of unconventional character. They consist of discrete narrow band pass filters $F_1$—$F_{10}$, each for passing one frequency selected from an array, as 2 or 3, preceded by an amplitude limiter 2, all of which have the same limit. Each filter is in series with a relatively small output resistor R, which are graduated in value, increasing values being assigned, in order, to successive ones of the filters, the resistances being proportional to the frequencies. All the resistances R then pass current to a relatively high resistance S, the voltage across which is detected or rectified by D, and a D.C. pulse output signal is derived from lead S1. Each limiter and filter thus is in series with a different voltage divider, consisting of one of resistances R plus S. The voltage across S will vary step-wise as a function of frequency.

The operation of the above described system is predicated on reception of one signal at a time, which would be true statistically in the presence of many signals occurring at random frequencies, if these were pulse signals of low duty cycle, such as radar pulses.

The system is obviously capable of radical extension of its total band-width capacity by proper selection of local oscillator arrays and I.F. bands. It may also be advantageous to select low frequency local oscillator frequencies which are harmonically related, as for array 2, 100, 200 . . . 1,000 mc. and for array 3, 10, 20, 30 . . . 100 mc., suitable I.F. frequencies being then 3,900–4,000 mc. for I.F. amplifier #1 and 3,890–3,900 for I.F. #2 although various other I.F. values may obviously be selected. More particularly if all the mixers employed are balanced mixers the I.F. band #1 employed may fall within the main band 4,000–5,000 mc., and the I.F. band #2 may fall within the I.F. band #1. Clearly, balanced mixers may be employed in all embodiments of my invention to reduce the number of conversion products.

While I have described and illustrated one specific embodiment of the present invention, it will become apparent that variations of the specific details of construction may be resorted to without departing from the true spirit and scope of the invention as defined in the appended claims.

What I claim is:

1. In combination, a source of a wide spectrum of frequencies, said spectrum of frequencies including a plurality of sub-bands located end to end within said spectrum, and each of said sub-bands including a plurality of sub-sub-bands located end to end within the sub-band, means responsive to a discrete signal in said spectrum for generating a different predetermined frequency representative of each different sub-band anywhere within which a discrete signal occurs, and means responsive to said discrete signal for generating a further different predetermined frequency representative of each different sub-sub band within which said signal occurs.

2. In a spectrum analyzer for measuring the frequency of a signal occurring at random in a main wide frequency band, means responsive to said signal for generating one of *n* marker frequencies each representative of the presence of said signal somewhere within a different one of *n* sub-bands of said main band, and means for generating one of *m* further marker frequencies each representative of the presence of said signal somewhere within a different one of *m* sub-sub-bands of any of said sub-bands.

3. In combination, a source of a main frequency band, a source of a plurality of equally relatively widely spaced first local oscillator frequencies, a first mixer, means for applying all said first local oscillator frequencies simultaneously and said main band to said first mixer for heterodyning, a first I.F. filter coupled to said mixer and having a bandwidth equal to the difference between two adjacent local oscillator frequencies, a source of a plurality of equally relatively narrowly spaced second local oscillator frequencies, a second mixer, means for simultaneously applying said plurality of second local oscillator frequencies and the signal output of said first I.F. filter to said second mixer for heterodyning, and a second I.F. filter connected to said second mixer, said second I.F. filter having a width equal to the difference between two adjacent ones of said second local oscillator frequencies.

4. The combination in accordance with claim 3 wherein is further provided, a first reflex mixer for heterodyning the signal output of said first I.F. filter with said main band, a second reflex mixer for heterodyning the signal output of said second I.F. filter with the output of said first I.F. filter, whereby to recover that one of each plurality of local oscillator frequencies which heterodyned said main band to within the pass bands of said first and second I.F. filters.

5. The combination in accordance with claim 4 wherein is further provided means for indicating as a single unitary positional indication, the frequencies of the last mentioned recovered local oscillator frequencies.

6. A spectrum analyzer for a signal in a main band of frequencies, which is divided into equal sub-bands, which are in turn each sub-divided into equal sub-sub-bands, correspondingly located sub-sub-bands within any sub-band having the same identifying letter, and the sub-bands being identifiable by number, comprising means for generating a different distinctive indication of the presence of a signal in each different one of said sub-bands 1 to *m*, where *m* is an integer, and still a different distinctive indication of the presence of said signal in each sub-sub-band of the same letter designation, and means responsive to said indications for providing a single unitary visual indication representative simultaneously of the one of said sub-bands and of said sub-sub bands in which said signal occurred, whereby said single unitary indication represents the position of said signal within the main band.

7. The combination according to claim 6 wherein said means for generating distinctive indications includes means for generating a selected one of a plurality of predetermined frequencies according to the number value of said sub-band, and means for generating a selected one of a further plurality of predetermined frequencies according to the letter value of said sub-sub-band.

8. The combination according to claim 6 wherein said means for generating distinctive indications includes means for generating a selected one of a plurality of predetermined D.-C. voltage values according to the number value of said sub-band, and means for generating a selected one of a further plurality of predetermined voltage values according to the letter value of said sub-sub-band.

9. The combination according to claim 6 wherein is further provided means for generating a signal representative of the frequency position of said signal within any of said sub-sub-bands.

10. In a system for measuring a frequency occurring at random time and position within a wide band, means for generating a distinctive signal having a characteristic representative of the sub-band of said main band in which said frequency occurs, means for generating a further distinctive signal having a characteristic representative of the sub-sub-band of any of said sub-bands in which said frequency occurs, said main band consisting of a plurality of said sub-bands and each sub-band consisting of a plurality of said sub-sub-bands.

11. A system for measuring a frequency occurring in a wide band, said wide band divisible into and consisting of $n$ sub-bands, each sub-band divisible into and consisting of $m$ sub-sub-bands, a source of a plurality of $n$ first frequencies, a source of a plurality of $m$ second frequencies, an indicator, and means for gating a selected one of said $n$ first frequencies and a selected one of said $m$ second frequencies to said indicator in accordance with the frequency position of said first mentioned frequency in said wide band, where $n$ and $m$ are integers which may be equal or unequal.

12. In combination, a source of an input signal of frequency S occurring within a band of width F1 to F2 c.p.s., a mixer, a source of plural local oscillations having frequencies of equal spacings $$\frac{F1 \text{ to } F2}{n}$$

c.p.s., where $n$ is greater than unity, means for applying to said mixer said input signal and said local oscillations, filter means for deriving from said mixer a heterodyne signal of frequency T equal to the algebraic sum of S and one of said local oscillator frequencies, said filter means having a bandwidth $$\frac{F1 \text{ to } F2}{n}$$

a further mixer, means for applying to said further mixer said heterodyne signal and said input signal, means for deriving from said further mixer a frequency equal to said one of said local oscillator frequencies, another mixer, another source of other local oscillations having frequencies of equal spacings equal to $$\frac{F1 \text{ to } F2}{mn}$$

where $m$ is an integer greater than unity, means for applying to said another mixer said signal of frequency T and said other local oscillations, further filter means for deriving from said further mixer a heterodyne signal V of frequency equal to the algebraic sum of T and some one of said other local oscillations, said further filter means having a bandwidth $$\frac{F1 \text{ to } F2}{mn}$$

means for heterodyning said signal V with said signal T and for deriving from said means for heterodyning a signal having the frequency of said some one of said other local oscillations, and means for identifying said signals derived from said further mixer and from said means for heterodyning.

13. A spectrum analyzer, comprising a source of an input signal of frequency S existing in a band F1 to F2 c.p.s., wherein said band is divided into and consists of an ordered array of sub-bands of width $$\frac{F1 \text{ to } F2}{n}$$

c.p.s., where $n$ is an integer greater than unity, and wherein each of said sub-bands is divided into and consists of an ordered array of sub-sub-bands of width $$\frac{F1 \text{ to } F2}{mn}$$

where $m$ is an integer greater than unity, a plurality of visual indicators each having an indication generator and means for moving said indication generator in two coordinate directions, one of said visual indicators corresponding with each different one of said sub-bands, means for disabling all said indication generators except that one which corresponds with the sub-band wherein said signal of frequency S exists, means for moving said indication generators simultaneously in one of said coordinate directions to a position representative of the position of said input signal with respect to the limits of any sub-band in which said input signal exists and in the other coordinate direction according to the frequency position of said input signal in any sub-sub-band in which said input signal exists.

14. The combination according to claim 13, wherein said visual indicators are cathode ray tubes, siad indication generators are electron beams, and said means for deflecting said indication generators comprising electron beam deflection devices and said means for disabling being a beam cut-off device.

15. A spectrum analyzer, comprising a source of an input signal of frequency S existing in a band F1 to F2 c.p.s., wherein said band is divided into and consists of an ordered array of sub-bands of width $$\frac{F1 \text{ to } F2}{n}$$

c.p.s., where $n$ is an integer greater than unity, and wherein each of said sub-bands is divided into and consists of an ordered array of sub-sub-bands of width $$\frac{F1 \text{ to } F2}{mn}$$

where $m$ is an integer greater than unity, a source of $n$ discrete frequencies, a source of $m$ further discrete frequencies, means responsive to said input signal for selecting one of said $n$ discrete frequencies according to and representative of the sub-band within which said input signal exists, and means responsive to said input signal for selecting one of said $m$ discrete frequencies according to and representative of the sub-sub-band within which said input signal exists.

16. The combination according to claim 15, wherein said $n$ discrete frequencies are separated in pairs by the width of said sub-bands, and wherein said $m$ discrete frequencies are separated in pairs by the width of said sub-sub-bands.

17. The combination according to claim 16, wherein is provided a visual indicator having means for generating a visual indication having positions in two coordinate directions, and means responsive to the selected frequencies for controlling said visual indicator to provide said visual indication in a position representatve in one coordinate of one of said selected frequencies and in the other coordinate of the other of said selected frequencies.

18. The combination according to claim 17, wherein is further provided means responsive to said input signal for indicating the frequency position of said input signal with respect to any sub-sub-band in which it exists, said last means having a frequency base line representative of the width of one sub-sub-band.

References Cited in the file of this patent

UNITED STATES PATENTS

| | | |
|---|---|---|
| 2,407,213 | Tunick | Sept. 3, 1946 |
| 2,500,431 | Potter | Mar. 14, 1950 |
| 2,507,576 | Reid | May 16, 1950 |

| | | |
|---|---|---|
| 2,525,629 | Hurvitz | Oct. 10, 1950 |
| 2,782,366 | Wall | Feb. 19, 1957 |

OTHER REFERENCES

Webster's International Dictionary, second edition, unabridged.

"A Multichannel Noise Spectrum Analyzer for 10–10,000 Cycles," article in The Review of Scientific Instruments, September 1954, pages 899–901.